May 4, 1926. 1,583,110
H. T. BAUGHER ET AL
SAFETY SIGNAL AND MOTOR CAR CONTROL
Filed Nov. 2, 1925 2 Sheets-Sheet 1
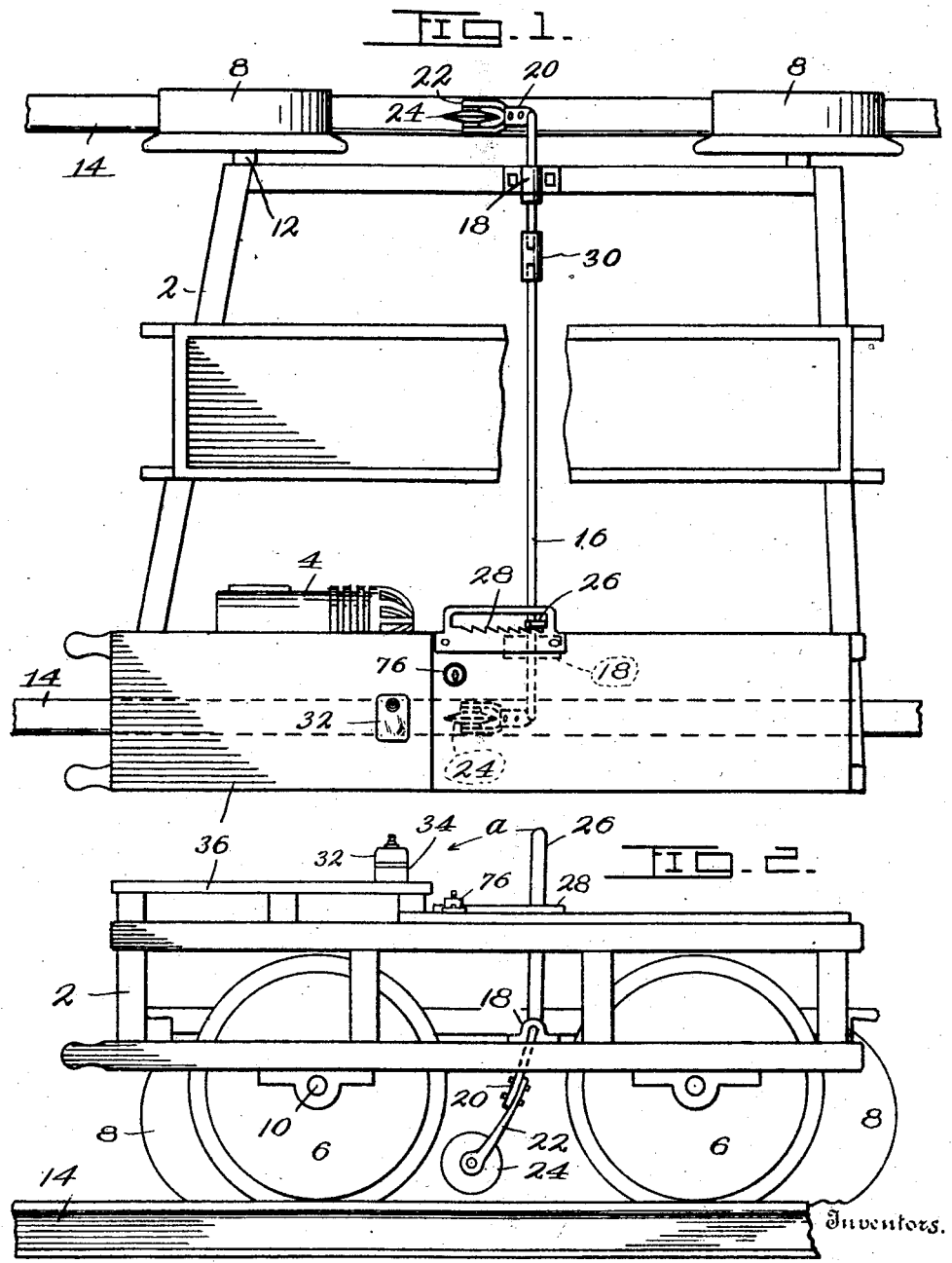
Inventors.
Harlie T. Baugher
and James E. Milum,
By F. G. Fischer,
Attorney.
Witness:
Fred C. Fischer.

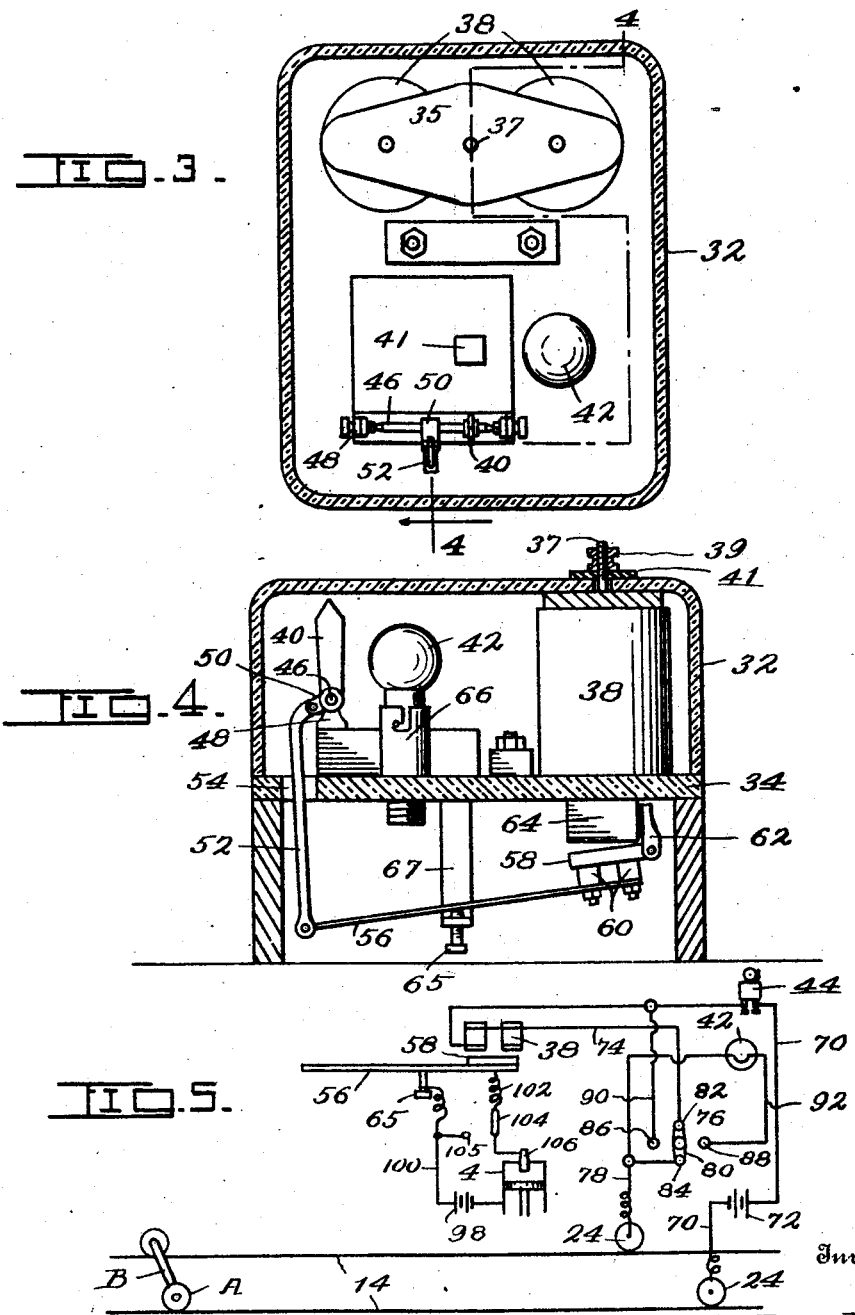

Patented May 4, 1926.

1,583,110

UNITED STATES PATENT OFFICE.

HARLIE T. BAUGHER AND JAMES E. MILUM, OF TRENTON, MISSOURI.

SAFETY SIGNAL AND MOTOR-CAR CONTROL.

Application filed November 2, 1925. Serial No. 66,301.

*To all whom it may concern:*

Be it known that we, HARLIE T. BAUGHER and JAMES E. MILUM, citizens of the United States, residing at Trenton, in the county of Grundy and State of Missouri, have invented certain new and useful Improvements in Safety Signals and Motor-Car Controls, of which the following is a specification.

Our invention relates to a safety signal system for use on hand cars or gasoline motor cars employed on railroads, and our object is to provide a system of this character for notifying workmen of the approach of a train from either direction in ample time for them to remove the car from the track before arrival of the train.

In order that the invention may be fully understood, reference will now be had to the accompanying drawings, in which:

Fig. 1 is a broken plan view of a gasoline car equipped with the invention.

Fig. 2 is a side elevation of the parts shown by Fig. 1.

Fig. 3 is a plan view partly in section of the signal means and associated parts.

Fig. 4 is an irregular section on line 4—4 of Fig. 3.

Fig. 5 is a diagram of the circuits employed in carrying out the invention.

Referring now in detail to the different parts, 2 designates a car which may be of any preferred type either hand or motor operated, but in the present instance is shown equipped with an engine 4. The car is mounted upon wheels 6 and 8 provided with individual stub shafts 10 and 12, respectively, to prevent a short circuit across the rails 14.

16 designates a rocker shaft journaled in bearings 18 mounted upon the car 2. The rocker shaft 16 is provided at its ends with arms 20, to the lower ends of which spring arms 22 are secured. A pair of trailing contacts 24, preferably in the form of rollers as shown, are journaled in the lower ends of the spring arms 22 and are held in contact with the rails 14 when a hand lever 26, fixed to the rocker shaft 16, is swung backwardly in the direction of the arrow *a*, Fig. 2. The lever 26 is held in any of its adjusted positions by a rack 28 fixed to an adjacent portion of the car body. In order to prevent a short circuit through the rocker shaft 16 the same is made in two sections, Fig. 1, which are rigidly united by a coupling 30 composed of suitable insulating material.

32 designates a glass case mounted upon a base 34 secured upon the car body, preferably at the forward portion of the seat 36 in order that the signals enclosed within said glass case 32 will be visible to the driver of the car 2. Enclosed within the case 32 is a pair of electromagnets 38, a day signal 40, and a night signal 42. The day signal 40 in the present instance is in the form of a semaphore, while the night signal 42 is preferably in the form of an incandescent lamp with a red bulb.

The electromagnets 38 are connected at their upper ends by a bar 35 having a centrally disposed stud 37 projecting upwardly through an opening in the top of the case 32 and provided with a nut 39 for removably holding said case 32 upon the base 34. A rubber washer or other suitable cushioning device 41 is interposed between the top of the case 32 and the bottom of the nut 39 to prevent the hard surface of the latter from injuring the former.

The signal 40 is fixedly mounted at one end upon a shaft 46 journaled in bearings 48 and provided with a fixedly mounted crank 50, pivoted to the upper end of a connecting rod 52 extending downwardly through an opening 54 in the base 34 and pivotally connected at its lower end to one end of a switch 56. The switch 56 is connected at its opposite end to the armature 58 of the electromagnets 38, but insulated therefrom through the intermediacy of suitable insulators 60. The armature 58 is pivotally connected to a bracket 62 secured to the poles 64 of the electromagnets 38.

The semaphore 40 is normally held in raised, or safety position, by the weight of the connecting rod 52, the switch 56 and the armature 58, and the downward movement of the switch 56 is checked by an adjustable contact 65 threaded through a bracket 67 depending from the base 34. The signal lamp 42 is removably mounted in a socket 66 secured to the base 34.

The electromagnets 38 are arranged in a circuit upon the car 2 and consisting of one of the roller contacts 24, wire 70, battery 72, a bell 44, the electromagnets 38, wire 74, snap switch 76, wire 78, and the other roller contact 24. When the foregoing circuit is closed as will hereinafter appear, the bell 44 is energized as is likewise the electromagnets 38, which, through the intermediary connections above described, swings the semaphore 40 to the danger or horizontal position where it is checked by a stop 41.

In practice the wires 70 and 78 are connected to opposite sides of the rocker shaft 16 from which the current passes to or from the roller contacts 24 through the arms 20 and 22. The snap switch 76 is of a well-known type embodying a manually operated rotary blade 80, two oppositely disposed contacts 82 and 84, and two oppositely disposed contacts 86 and 88.

During the day the rotary blade 80 is adjusted to the position shown on the diagram Fig. 5, to cut out the lamp 42, and at night is adjusted to engage the contacts 86 and 88 for the purpose of cutting out the electromagnet 38 and cutting in the lamp circuit consisting of one of the roller contacts 24, wire 70, battery 72, wire 90, contact 86, switch blade 80, contact 88, wire 92, lamp 42, wire 78, and the other roller contact 24.

Either of the foregoing circuits are closed through wheels and axles A and B of a train or car approaching from either direction. As the bell 44 is connected to the wire 70 at a point between the battery 72 and the wire 90, said bell 44 will be energized when either the electromagnet circuit or the lamp circuit is closed. The distance at which the closing of the circuits will be effected will depend upon the electromotive force of the battery 72, and in practice will be sufficient to give the workmen ample time to remove the car 2 from the track before arrival of the train or car.

In addition to the circuits above described, provision is made for automatically opening the car engine circuit on the approach of a train, for the purpose of stopping the engine 4. As shown on the diagram, Fig. 5, the engine circuit comprises a local battery 98, a wire 100 leading from the engine frame, the contact 65, the switch 56, a wire 102, a manual switch 104, and the spark plug 106. Normally the foregoing circuit is closed, but when the electromagnets 38 are energized and attract the armature 58 the same raises the switch 56 from the contact 65, thereby opening the circuit and stopping the engine 4.

When it is desired to closely follow a train or another car, the roller contacts 24 may be raised from the rails 14 to open the electromagnet and lamp circuits above described, or the switch 56 may be short circuited by throwing the switch 104 into engagement with the contact 105, thereby closing the engine circuit independently of said switch 56.

From the foregoing description, taken in connection with the accompanying drawings, it is apparent that we have provided a safety signal system embodying the advantages above pointed out, and while we have shown one form of the apparatus, we reserve the right to all such modifications thereof as properly fall within the spirit and scope of the invention as claimed.

Having thus described our invention, what we claim and desire to secure by Letters Patent, is:

1. In a signal system of the character described, the combination with a car having its wheels on one rail insulated from the wheels on the other rail, a signal circuit upon the car embodying rail contacts and adapted to be closed on short circuiting of the rails, mechanism for engaging and disengaging said contacts from the rails, a visual signal upon the car, a shaft upon which said signal is mounted, a crank fixed to said shaft, a connecting rod pivotally-secured to said crank, an armature, an element connecting said armature and the connecting rod, and magnetic means connected to the signal circuit and adapted when energized to actuate the armature.

2. In a signal system of the character described, the combination with a car having its wheels on one rail insulated from the wheels on the other rail, a signal circuit upon the car embodying rail contacts and adapted to be closed on short circuiting of the rails, mechanism for engaging and disengaging said contacts from the rails, a visual signal upon the car, a shaft upon which said signal is mounted, a crank fixed to said shaft, a connecting rod pivotally-secured to said crank, an armature, a switch connecting said armature and the connecting rod, magnetic means in the signal circuit adapted to actuate the armature and effect movement of the visual signal from safety to danger position and simultaneously open the switch, and an engine circuit controlled by said switch.

3. In a signal system of the character described, the combination with a car having its oppositely disposed wheels insulated from each other, a signal circuit consisting of rail contacts adapted to be engaged and disengaged from the rails, a semaphore, an electromagnet for actuating said semaphore and which is energized by the circuit when the same is closed on short circuiting the rails, a night signal circuit connected across the first-mentioned circuit in advance of said electromagnet, and a manual switch adjustable to close the first-mentioned circuit and open the night circuit, or adjustable to close the night circuit and effect short circuiting of that portion of the first-mentioned circuit embodying the electromagnet.

In testimony whereof we affix our signatures.

HARLIE T. BAUGHER.
JAMES E. MILUM.